United States Patent
Amendt et al.

(10) Patent No.: US 9,466,397 B2
(45) Date of Patent: Oct. 11, 2016

(54) INDIRECT DRIVE TARGETS FOR FUSION POWER

(75) Inventors: Peter A. Amendt, Danville, CA (US); Robin R. Miles, Danville, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 1081 days.

(21) Appl. No.: 13/290,282

(22) Filed: Nov. 7, 2011

(65) Prior Publication Data

US 2012/0114088 A1    May 10, 2012

Related U.S. Application Data

(60) Provisional application No. 61/411,390, filed on Nov. 8, 2010, provisional application No. 61/425,198, filed on Feb. 1, 2011.

(51) Int. Cl.
| | |
|---|---|
| G21B 1/19 | (2006.01) |
| G21B 1/03 | (2006.01) |
| G21B 1/13 | (2006.01) |
| G21B 1/17 | (2006.01) |
| G21B 1/23 | (2006.01) |

(52) U.S. Cl.
CPC . *G21B 1/03* (2013.01); *G21B 1/13* (2013.01); *G21B 1/17* (2013.01); *G21B 1/23* (2013.01); *G21B 1/19* (2013.01); *Y02E 30/128* (2013.01)

(58) Field of Classification Search
CPC ............ G21B 1/19; G21B 1/01; G21B 1/23; G21B 1/03; G21B 1/00; Y02E 30/16; Y02E 30/14; Y02E 30/10; Y02E 50/30; G21D 7/00; H01S 3/0057; H01B 1/04

USPC ................ 376/103, 102, 150, 107; 252/587; 264/0.5; 356/337; 359/342, 345; 977/700, 734, 750, 755, 842
See application file for complete search history.

(56) References Cited

U.S. PATENT DOCUMENTS

| | | |
|---|---|---|
| 2,991,238 A | 7/1961 | Phillips et al. |
| 3,967,215 A | 6/1976 | Bellak |
| 4,116,264 A | 9/1978 | Farfaletti-Casali et al. |

(Continued)

FOREIGN PATENT DOCUMENTS

| | | |
|---|---|---|
| WO | 2009058185 A2 | 5/2009 |
| WO | WO 2009058185 A2 * | 5/2009 |

OTHER PUBLICATIONS

Lettington, A et al. (Abstract, The Protection of Front Surfaced Aluminum Mirrors with Diamond like Carbon Coatings for use in the Infrared; Royal Signals and Radar Establishment, Malvern, England Published Report 1981, Report No. RSRE-MEMO-3295, BR77777, p. 11).*

(Continued)

*Primary Examiner* — Sean P Burke
(74) *Attorney, Agent, or Firm* — Kilpatrick, Townsend, Stockton

(57) ABSTRACT

A hohlraum for an inertial confinement fusion power plant is disclosed. The hohlraum includes a generally cylindrical exterior surface, and an interior rugby ball-shaped surface. Windows over laser entrance holes at each end of the hohlraum enclose inert gas. Infrared reflectors on opposite sides of the central point reflect fusion chamber heat away from the capsule. P2 shields disposed on the infrared reflectors help assure an enhanced and more uniform x-ray bath for the fusion fuel capsule.

20 Claims, 4 Drawing Sheets

(56) References Cited

U.S. PATENT DOCUMENTS

| | | | |
|---|---|---|---|
| 4,145,250 | A | 3/1979 | Ohkawa et al. |
| 4,232,244 | A | 11/1980 | Fink et al. |
| 4,296,153 | A | 10/1981 | Mahl |
| 4,344,911 | A | 8/1982 | Maniscalco et al. |
| 4,348,354 | A | 9/1982 | Artaud et al. |
| 4,367,193 | A | 1/1983 | Bussard |
| 4,367,194 | A | 1/1983 | Schenewerk et al. |
| 4,440,714 | A | 4/1984 | Rose |
| 4,774,048 | A | 9/1988 | Yang |
| 5,020,880 | A * | 6/1991 | Bluege .......... 359/894 |
| 5,748,321 | A | 5/1998 | Burks et al. |
| 6,903,873 | B1 * | 6/2005 | Joannopoulos et al. ...... 359/584 |
| 7,079,001 | B2 | 7/2006 | Nordberg |
| 7,273,290 | B1 | 9/2007 | Robitaille |
| 2005/0220243 | A1 | 10/2005 | Greatbatch |
| 2007/0195310 | A1 | 8/2007 | Kanda et al. |
| 2008/0063132 | A1 | 3/2008 | Birnbach |
| 2008/0256850 | A1 * | 10/2008 | Kley .............. 44/502 |
| 2010/0212133 | A1 | 8/2010 | Montesanti et al. |

OTHER PUBLICATIONS

Powell, F (Recent Contributions to the use of Polymide in the Fabrication of ICF and IFE Targets; Fusion Science and Technology, 45.2, Apr. 23, 2004, p. 197-201).*

Oxford Dictionaries (verb: Diminish or reduce in thickness towards one end; URL http://www.oxforddictionaries.com/definition/english/taper).*

International Search Report for PCT application PCT/US2011/05979 (Mar. 27, 2012).

Meier et al. "Chamber and Target Technology. Development for Inertial Fusion Energy," Lawrence Livermore National Laboratory (Apr. 7, 1999).

Tillack et al. "Target and Chamber Technologies for Direct-Drive Laser IFE," UC San Diego Final Report for the IAEA CRP: Pathways to Energy from Inertial Fusion (IFE)—an Integrated Approach (Apr. 30, 2012).

* cited by examiner

INDIRECT DRIVE TARGETS FOR FUSION POWER

REFERENCE TO RELATED APPLICATIONS

This United States patent application is related to, and claims priority from, two earlier filed U.S. Provisional Patent Applications entitled "Inertial Confinement Fusion Power Plant which Decouples Life-Limited Components from Plant Availability," filed Nov. 8, 2010, as Ser. No. 61/411,390 and from a provisional application having the same title and filed Feb. 1, 2011, as Ser. No. 61/425,198. Each of these provisional applications is hereby incorporated by reference in their entirety.

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC.

BACKGROUND OF THE INVENTION

This invention relates to targets for fusion reactions, and in particular to targets for fusion-based power plants.

The National Ignition Facility (NIF) is laser-based inertial confinement fusion research machine at the Lawrence Livermore National Laboratory in Livermore, Calif. NIF uses lasers to heat and compress a capsule of deuterium and tritium fuel contained within a hohlraum to the temperatures and pressures to cause a nuclear fusion reaction. The laser beams do not strike the capsule directly; rather, they are focused onto the interior surface of the hohlraum, a technique known as indirect drive. A goal of NIF is to reach "ignition," a condition that produces more energy than used to start the reaction.

The NIF hohlraum is a generally cylindrical cavity whose walls emit radiant energy towards the interior. In the indirect drive approach to inertial confinement fusion, the fusion fuel capsule is held inside a cylindrical hohlraum and the laser beams enter through laser entrance holes at the ends of the cylinder, striking the interior surface of the hohlraum. The hohlraum absorbs and re-radiates the energy as x-rays onto the capsule. The goal of this approach is to have the energy re-radiated in a more symmetric manner than would be possible in the direct drive approach in which the laser beams strike the fuel capsule directly, i.e., without an intervening hohlraum.

A typical prior art hohlraum and capsule, as used at NIF, is shown in FIG. 1.

BRIEF SUMMARY OF THE INVENTION

For inertial confinement fusion to become the reliable clean source of electrical energy that is needed throughout the world, it is estimated that a megawatt size power plant will require on the order of 10 to 15 targets per second. The targets are injected into a fusion engine chamber and fired upon by a bank of lasers. The NIF system presently uses 192 lasers to focus energy on the interior surfaces of the hohlraum within its target chamber.

For development of cost effective fusion power, inertial confinement fusion target designers must consider many engineering requirements in addition to the physics requirements for a successful target implosion. These considerations include low target cost, high manufacturing throughput, the ability of the target to survive the injection into the fusion chamber and arrive in a condition and physical position consistent with proper laser-target interaction, and the ease of post-implosion debris removal. In addition, these requirements include the ability to handle the acceleration forces of injection into the fusion chamber, the ability to maintain a cold DT near its triple-point temperature during flight through the hot fusion chamber, yet provide a highly efficient uniform illumination of the capsule containing the fusion fuel.

In a preferred embodiment we provide a hohlraum for an indirect drive inertial confinement fusion power plant in which the hohlraum surrounds a capsule at a central location containing fusion fuel. The hohlraum has an exterior surface with two end regions and a mid-region between the two end regions. The mid region has a generally symmetrical cylindrical configuration of first diameter about a central axis, while each of the end regions taper from the first diameter to a second smaller diameter at the ends of the hohlraum. Each of the end regions of the hohlraum has a laser beam entrance hole and a covering to enclose a gas within the hohlraum. The interior of the hohlraum is gas filled and defined by an interior wall having an oval shape with respect to the center axis.

DETAILED DESCRIPTION OF THE INVENTION

We have designed a target to satisfy these demands for a laser based inertial confinement fusion power plant, often referred to here as the Laser Inertial Fusion-based Energy (LIFE) power plant, currently under development. This planned power plant uses multiple laser-beam drivers for ignition. Parameters of the system relevant to the LIFE target design are listed in Table 1 below:

TABLE 1

Planned Target Requirements

| Parameter | Value |
|---|---|
| Per-target cost | <30 cents |
| Repetition rate | 10-20 Hz. |
| Injection acceleration rate | ~6000 m/s$^2$ |
| Injection exit velocity | ~250 m/s |
| Chamber gas temperature | 6000-8000 K |

TABLE 1-continued

Planned Target Requirements

| Parameter | Value |
|---|---|
| Chamber gas pressure | ~23 Torr |
| Chamber wall temperature | ~900 K |
| Chamber radius | ~6 m |
| Maximum DT temperature change | ~100 mK |

Figure 1:
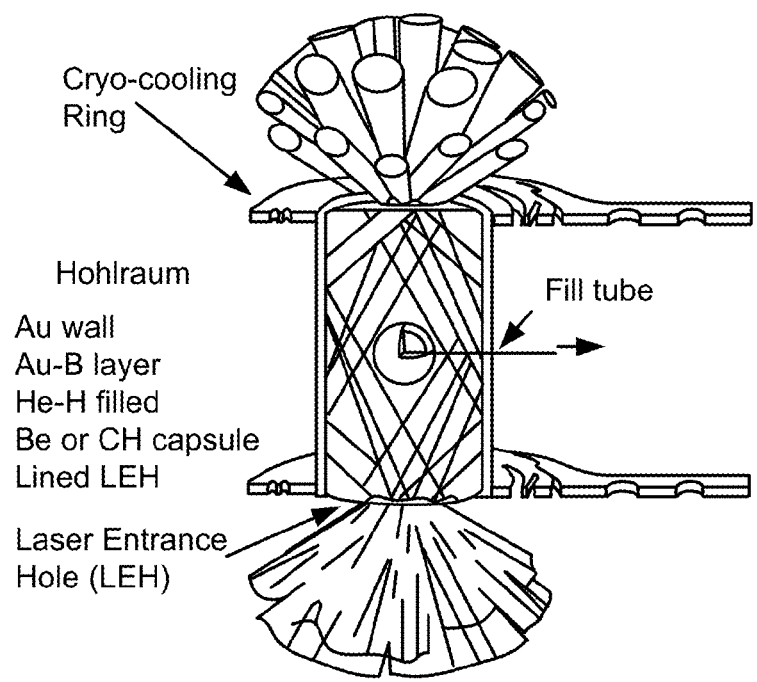
FIG. 1 illustrates a prior art hohlraum and capsule such as used by NIF.
Figure 2:
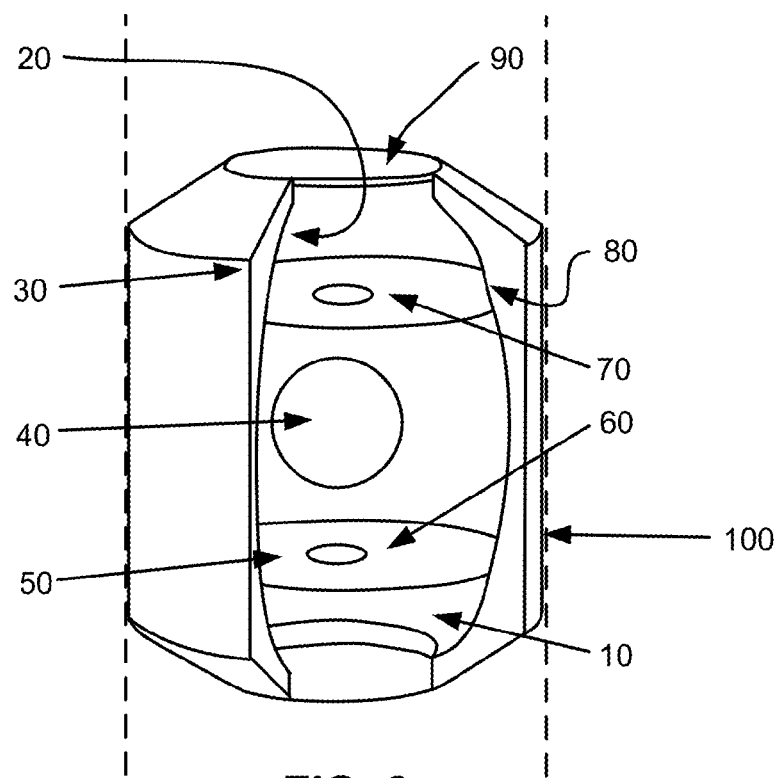
FIG. 2 is a perspective view of a preferred embodiment of the hohlraum and capsule.

FIG. 2 is an illustration of a preferred embodiment of the target of this invention that satisfies the criteria of Table 1. The capsule 40 containing the fusion fuel is about a 4 mm diameter hollow spherical capsule 40 made of high density carbon. In a preferred embodiment, the capsule has a chemical vapor deposition deposited diamond ablator wall, with a thickness less than about 100 μm. A nanoporous foam, e.g. CH1.2, lines the interior wall of the capsule. The inner deuterium-tritium (DT) fuel layer is about 150 μm thick. When in use the capsule and hohlraum are cooled to a low temperature on the order of less than 20K.

The hohlraum 100 is made generally of lead, about 1 cm in diameter by about 2 cm long, with an insulating wall 30. An approximately 20 μm thick layer of high-Z material 20 (i.e., a lining material), e.g., plated lead, on the inside hohlraum wall provides for more efficient x-ray production. The hohlraum has a rugby ball-shaped interior 80 for better coupling of the expected approximately 2.2 megajoule (MJ) laser energy to the capsule 40. The shape of the interior surface is a circular arc with origin vertically offset to satisfy the prescribed dimensions of the hohlraum, e.g., maximum and minimum inner radii, and length.

Infrared reflectors 50, typically a low-Z membrane material such as carbon or polyimide coated with a thin reflective metal layer such as 30 nm thick aluminum, help protect the capsule from radiant heat in the fusion chamber. "P2" shields 60 and 70, typically manufactured from the same material as the hohlraum, and deposited onto the polyimide membrane, provide symmetry and enhancement of the x-ray bath around the capsule 40. An additional low-Z membrane is used to support the capsule 40 within the hohlraum 100. The hohlraum is filled with helium gas which tamps the degree of the hohlraum wall expansion to provide greater symmetry control. The gas is sealed in by the windows 90 over the laser entrance holes at opposite ends of the hohlraum. The exterior surface of the hohlraum 100 has cylindrical sides to enable guidance by a target injector used to introduces the targets into the fusion chamber.

Thermal Considerations

A low pressure (about 23 Torr) xenon atmosphere is used in the fusion chamber to protect the first wall of the fusion chamber from the assault of ions and much of the prompt x-ray radiation produced during thermonuclear detonation. While this permits the use of more conventional materials for the first wall, it increases the difficulty of maintaining the DT layer temperature at about 19° K. during flight of the target though this atmosphere, which remains at temperatures of about 8000° K. The hohlraum substrate 30 insulates the capsule 40 from the hot xenon gas during the approximately 24 ms flight time to the chamber center.

Figure 3:
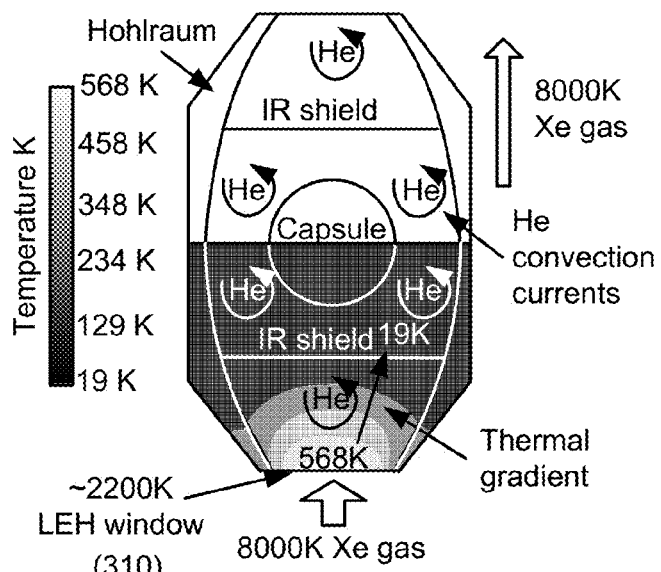
FIG. 3 is a diagram illustrating a temperature profile.
Figure 4:
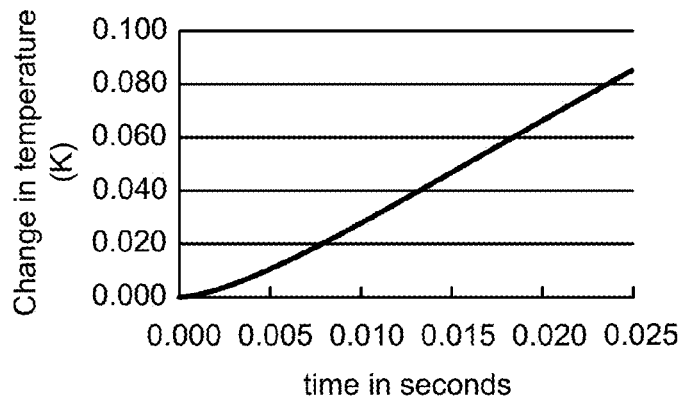
FIG. 4 is a graph illustrating the change in temperature with time for the hohlraum.

The approximately 500 nm thick graphene or graphene-composite windows 90 over the laser entrance holes (LEH) 310 heat rapidly in the 8000° K Xe atmosphere to about 2200° K, but remain below the temperature limit of graphene (about 3000° K). The helium atmosphere fill (about 1 mg/cc) in the hohlraum transports heats to the hohlraum which acts as the thermal heat sink. This is illustrated by FIG. 3 which provides a calculated temperature distribution for the target as it passes through the fusion chamber. As shown in FIG. 3 the infrared radiation from the 900° K chamber walls reflects off the IR shields 60, 70 inside the hohlraum. These IR shields comprise a thin polyimide membrane about 400 nm in thickness coated with about 30 nm of metalized aluminum. The infrared shields heat the helium near the capsule 40. The DT temperature is expected to rise about 80 mK which is below our goal of a 100 mK maximum change in temperature. FIG. 4 is a graph illustrating the expected fuel temperature rise as a function of flight time in the chamber.

Structural Considerations

The hohlraum is made sufficiently robust to the ~600 g acceleration forces of injection by the choice of materials and wall thickness. The more fragile components of the target are the DT layer within the capsule and the ~110 nm thick carbon-based capsule support membrane. Hydrogen isotopes have high affinity to other materials. If the DT layer adheres to the ablator as expected, then the ablator provides structural support for the DT layer. Our analysis indicates that a chemical vapor deposition deposited diamond ablator layer coupled with a layer of deuterium will result in deformation of the capsule of <1 μm out-of-round. This is within our expected tolerances. Analysis to date of the capsule support membrane using membrane data taken for NIF targets and applied to membrane deflection equations suggest that the membrane will remain intact up to acceleration rates of 600 g provided that the membrane is molded to conform to the shape of the capsule with a minimum amount of initial pre-stress such that the acceleration forces are the dominant forces affecting membrane deflection.

Figure 5:
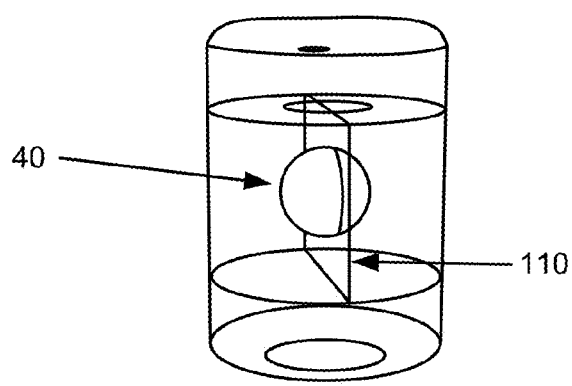
FIG. 5 is a perspective view illustrating another embodiment of the target.

Another approach to reduce membrane forces and deflections is to orient the capsule support membranes in the direction of the acceleration force. This is illustrated in FIG. 5 for a cylindrical hohlraum, but the approach can be used for other hohlraum configurations, e.g., as depicted in FIG. 2. The membrane is anchored to the hohlraum structure partition line which is also oriented axially. In this case it is expected that the tolerable acceleration rate will exceed 1000 g. We expect that measurement of the material properties for candidate materials at cryogenic conditions, coupled with finite element analyses of the thin membranes, will confirm that the support membrane will survive both the static and dynamic forces of injection acceleration.

Material Considerations

Removal of the debris from the chamber following the implosion and subsequent recycling and/or disposal also imposes design constraints for target material selection. This is especially true for the hohlraum material which constitutes the majority of the mass of the target. As described above, the hohlraum consists of an inner high-Z layer and a thermally insulating-structural support material. In some implementations it will also include a conductive outer layer if an induction injector or an electromagnetic trajectory steering section is used for injection.

It is desirable for the hohlraum materials to have a melting temperature lower that the wall temperature of 900K so that solid deposits will not accumulate on the fusion chamber wall. Such deposits could alter the thermal or neutronic characteristics of the wall, or they might create a cloud of solid debris near the wall which could reduce the laser propagation through the chamber, or even effect target flight into the chamber. Materials with a high vapor pressure can be continuously pumped out of the chamber for easy removal.

Figure 6:
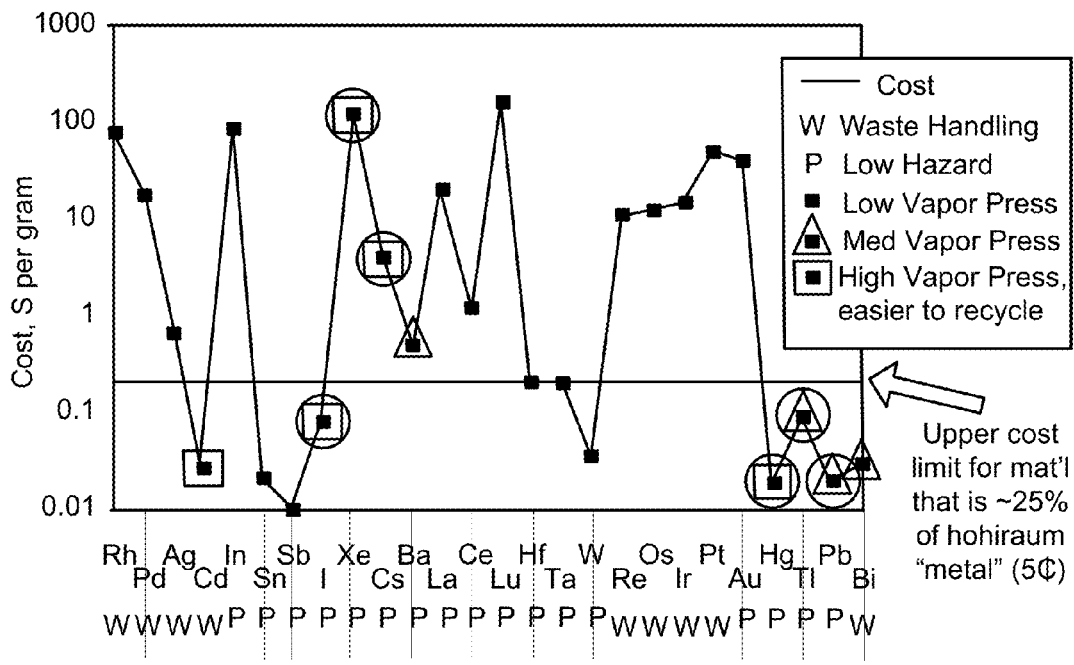
FIG. 6 is a diagram illustrating costs associated with various materials.

With regard to laser propagation through the residual vapor, absorption lines near the laser frequency which result in Stokes-shifted Raman scattering are being analyzed to determine if this effect will significantly affect the amount of laser light reaching subsequent targets. Lead is an attractive high-Z hohlraum material because it is inexpensive, has low-level activation products and is easily manufactured through swaging or plating. Less expensive materials with low-radiation activation levels such as lead could be discarded as low-level waste or recycled if the recycling costs are low. Materials that may present a waste-disposal challenge because of activation are avoided. Cost, vapor-pressure based debris removal and waste disposal selection criteria for the high-Z layer of the hohlraum are summarized in FIG. 6.

Manufacturing Considerations

Figure 7:
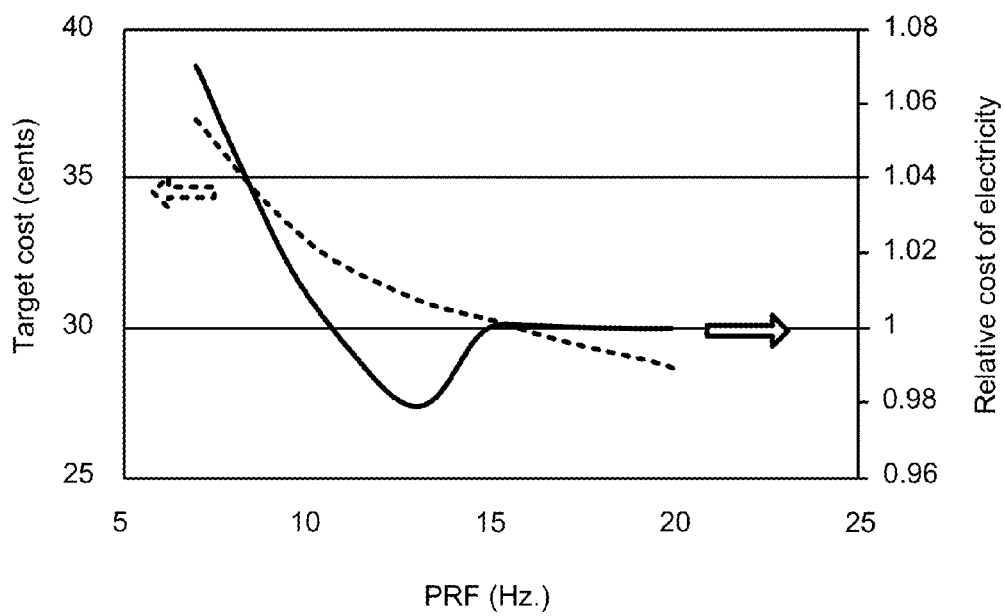
FIG. 7 is a graph showing the relationship among target injection rate, target cost and the relative cost of electricity.

Manufacturing cost is a consideration for both the choice of target material and the specific target geometry. Ideally, the selected material preferably is a small fraction of the overall target cost. The bulk of the target costs results from mechanical and chemical processing operations. Lower production costs result from conventional high-throughput manufacturing techniques such as die-casting or stamping for the mechanical processes, and from increasing the batch size of chemical processes, e.g., chemical vapor deposition and electroplating. Our preliminary cost analysis suggests that the per-target cost can be less than 30 cents. Preliminary cost analysis is illustrated in FIG. 7 which also illustrates the impact of target costs, repetition rate and relative cost of electricity.

We estimate that material costs for lead hohlraums and a CVD diamond capsule ablator costs are a relatively small part of the target costs (~17%) while the equipment costs are a relatively large fraction (~42%) of the overall target cost. This is a result of the large number of plasma CVD coating machines required to produce the ~1.3 million capsules per day even with the large batch size (~45,000 per batch) that is postulated.

Injection-Tracking Considerations

Another design consideration of the target is to incorporate features necessary for tracking the target trajectory through the chamber such that it will connect with the laser-driven beams to within about 100 μm of the designed engagement point. The distance between the muzzle end of the injector and the chamber center is set by the maximum neutron flux that can be tolerated by the DT layer. The temperature of the DT layer can be unacceptably increased by interaction with the neutrons or by any component parts of the injector system which may experience unacceptable neutron damage. A shuttered neutron shield system located between the injector and the chamber reduces the neutron and gamma radiation to the target. For a description of the particular injector mechanism and target tracking system, see the commonly assigned, co-pending PCT Patent Application entitled "Fusion Target Injection and Tracking" International Application Number PCT/US2011/059791, filed on Nov. 8, 2011. The contents of that application are incorporated herein by reference.

The shorter the distance between the injector muzzle and the chamber center, the more accurately the target can be placed in fusion chamber center. Injection accuracy depends on the dimensional quality of the injector and the mitigation of vibration. Our objective is to place the targets within a ±500 μm lateral dimension perpendicular to the target trajectory at chamber center which is equal to the expected range of motion of the laser pointing system for final optics placed 20 meters from the fusion chamber center. The tracking system measures the position and velocity of the target as it traverses the chamber. The system consists of a set of crossing laser beams triggered by the external shape of the target. It is expected that the target can be tracked to within about ±50 μm with reference to the chamber center. When the target is within about 25 μs of the chamber center (~6 mm for a 250 m/s target velocity), the engagement sensors, which use the same optics as the laser, measure the position of the target relative to the pointing direction of the laser to within an expected accuracy of ±10 μm and correct the laser pointing direction to impact the target to within the ±100 μm. Changes in velocity or expected position of the target as determined by the tracking system are corrected by the engagement sensors. The engagement system relies on the front and aft faces of the target reflecting laser light in a defined pattern, e.g., a ring pattern or other fiducial. This allows the engagement sensors to accurately predict the position of the target.

Physics of the Target

The physics design of the target is discussed in detail in the attached Appendix A, "Life Pure Fusion Target Designs: Status And Prospects," by Amendt, Dunne, Ho and Lindl, incorporated by reference herein.

Figure 8:
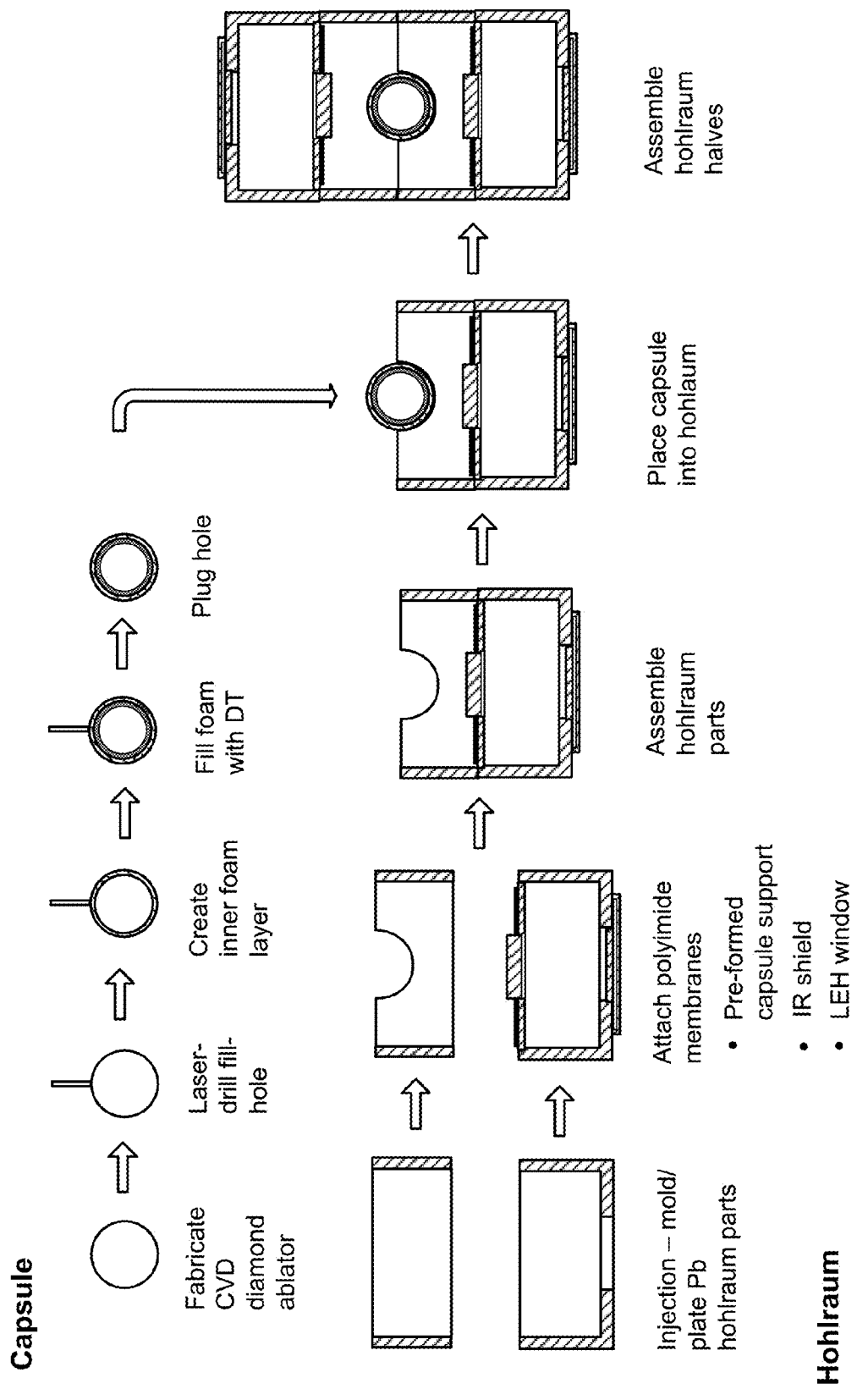
FIG. 8 is a diagram illustrating a manufacturing process for manufacture of the hohlraum and capsule.

FIG. 8 is a schematic diagram illustrating a manufacturing process for manufacture of the capsule and hohlraum as described above. The capsule fabrication begins with fabrication of a diamond ablator shell for containment of the DT fuel. This process is carried out by chemical vapor deposition on a spherical shell. A fill hole is informed in the capsule to enable the introduction of a nanofoam consisting of CH1.2 a carbon-based polymeric material. The DT fuel is then introduced into the capsule and absorbed into the foam. The nature of the process is carried out at about 300K, resulting in the foam and DT fill being self-leveling upon cooling to about 15-20K in a later part of the process, i.e., forming a uniformly thick layer around the inside of the capsule wall. Once the DT-vapor-phase fill process is complete the hole in the capsule wall is plugged, e.g., by polymers and high density carbon. The formation of the foam layer consists of introducing an aliquot of foam into the shell, forming a layer of solgel on the inside surface of the capsule through spin-coating or dielectrophoresis or other method during the polymerization process, then extraction of the solvent matrix.

The bottom portion of FIG. 8 illustrates the hohlraum manufacturing process. Using injection molding and plating operations the bulk hohlraum parts are prepared. (Note that the process is illustrated schematically for a cylindrical hohlraum, as opposed to the hohlraum depicted in FIG. 2, which would be manufactured using the same process.) The hohlraum could be die-cast, molded or swaged using lead or other high-Z materials. At the second step in the process the infrared shields and laser entrance hole windows are affixed to the hohlraum components, with the support membrane having a preformed depression to support the capsule.

Next as shown in the third manufacturing step of the process, the hohlraum parts are assembled together. The capsule is then provided and placed into the preformed capsule support membrane. Then, as shown in the last step of the process, the other half of the hohlraum, manufactured using the same process steps in the same order as provided, and the 2 halves are joined together.

The preceding is a description of a preferred embodiment of indirect drive targets for use in a fusion power plant. It is important to note that numerous modifications can be made to the design of the target without departing from the scope of the invention as claimed below. For example, other materials may be substituted for the windows covering the laser entrance holes, the material of the hohlraum itself, its shape, and its components.

What is claimed is:

1. A hohlraum for an indirect drive inertial confinement fusion power plant in which the hohlraum surrounds a capsule at a central location containing fusion fuel, with the hohlraum comprising:
    an exterior surface having two end regions and a mid-region between the two end regions, the mid-region having a generally symmetrical cylindrical configuration of first diameter about a central axis and characterized by a center plane perpendicular to the central axis of the hohlraum and disposed at the central location, each of the end regions tapering from the first diameter to a second smaller diameter at ends of the hohlraum;
    a laser beam entrance hole at each of the end regions of the hohlraum;
    a covering at each of the end regions of the hohlraum to enclose a gas therein; and
    a hollow interior defined by an interior wall having a continuously curved oval shape, wherein normals to the interior wall are only perpendicular to the central axis of the hohlraum in the center plane.

2. A hohlraum as in claim 1 wherein each of the end regions comprises a truncated cone shaped protrusion extending between the mid-region and the laser beam entrance holes.

3. A hohlraum as in claim 2 wherein the covering over each of the laser entrance holes is substantially transparent.

4. A hohlraum as in claim 2 wherein the hollow interior contains an inert gas confined between the covering at each end of the hohlraum.

5. A hohlraum as in claim 4 wherein the inert gas comprises helium.

6. A hohlraum as in claim 1 further comprising a lining material disposed on the interior wall.

7. A hohlraum as in claim 6 wherein the lining material comprises a material of higher density than the interior wall.

8. A hohlraum as in claim 6 further comprising two infrared reflectors, one disposed between the covering at one end of the hohlraum and a mid-point along the central axis of the hohlraum and the other disposed between the covering at an opposite end of the hohlraum and the mid-point along the central axis of the hohlraum.

9. A hohlraum as in claim 8 further comprising a shield disposed on each of the two infrared reflectors.

10. A hohlraum as in claim 9 wherein each of the shields comprises material which is the same as the lining material.

11. A hohlraum as in claim 9 wherein each of the shields comprises a reflective disk having a center aligned to the central axis of the hohlraum.

12. A hohlraum as in claim 1 further comprising a membrane disposed perpendicular to the central axis to support the capsule along the central axis near a central point along the central axis.

13. A hohlraum as in claim 12 wherein the membrane comprises a carbon-based material.

14. A hohlraum as in claim 13 wherein the carbon-based material comprises at least one of polyimide, graphene, graphene-reinforced polymer, diamond-like-carbon, or diamond.

15. A hohlraum as in claim 1 further comprising a membrane disposed along the central axis to support the capsule along the central axis.

16. A hohlraum as in claim 6 wherein the lining material comprises a high-Z material such as lead.

17. A hohlraum as in claim 1 wherein the covering at each of the end regions comprises a carbon-based material.

18. A hohlraum as in claim 17 wherein the carbon-based material comprises at least one of polyimide, graphene, graphene-reinforced polymer, diamond-like-carbon, or diamond.

19. A hohlraum as in claim 1 wherein the tapering of the end regions comprises a linear taper from the first diameter to the second smaller diameter.

20. A hohlraum as in claim 2 wherein the truncated cone shaped protrusions are characterized by the first diameter near the mid-region and the second smaller diameter near the laser beam entrance holes.

* * * * *